(12) United States Patent
Ferlitsch

(10) Patent No.: US 7,443,529 B2
(45) Date of Patent: Oct. 28, 2008

(54) VOLUME OF WORK ESTIMATING FOR COMBINED PROCESSING AND UNPROCESSED IMAGING JOBS

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 937 days.

(21) Appl. No.: 10/886,198

(22) Filed: Jul. 7, 2004

(65) Prior Publication Data

US 2006/0007461 A1 Jan. 12, 2006

(51) Int. Cl.
*G06F 3/12* (2006.01)
*G06K 15/00* (2006.01)

(52) U.S. Cl. .................. 358/1.15; 358/1.1; 358/1.16; 358/1.17

(58) Field of Classification Search ................ 358/1.15, 358/1.13, 1.16, 1.14, 1.1, 1.18, 1.17, 1.2, 358/1.6, 1.9, 1.11, 1.4, 1.5, 407, 468, 404, 358/444, 401; 347/2, 3, 5, 23; 399/1, 8, 399/10; 710/15, 17, 18, 19
See application file for complete search history.

(56) References Cited

U.S. PATENT DOCUMENTS

| | | | | |
|---|---|---|---|---|
| 5,179,637 A | * | 1/1993 | Nardozzi | 358/1.15 |
| 5,287,194 A | * | 2/1994 | Lobiondo | 358/296 |
| 5,559,933 A | * | 9/1996 | Boswell | 358/1.15 |
| 5,862,348 A | | 1/1999 | Pedersen | |
| 5,978,560 A | | 11/1999 | Tan et al. | |
| 6,373,585 B1 | * | 4/2002 | Mastie et al. | 358/1.15 |
| 6,429,947 B1 | | 8/2002 | Laverty et al. | |
| 7,218,409 B2 | * | 5/2007 | Ferlitsch | 358/1.15 |
| 7,339,687 B2 | * | 3/2008 | Ferlitsch | 358/1.13 |
| 2002/0016366 A1 | | 2/2002 | Knaup | |
| 2002/0026379 A1 | | 2/2002 | Chiarabini et al. | |
| 2002/0080388 A1 | | 6/2002 | Chrisop et al. | |
| 2002/0089691 A1 | | 7/2002 | Ferlitsch et al. | |
| 2003/0053112 A1 | | 3/2003 | Motosugi et al. | |

FOREIGN PATENT DOCUMENTS

EP 0917042 6/1998

\* cited by examiner

*Primary Examiner*—Dov Popovici
(74) *Attorney, Agent, or Firm*—David C. Ripma; Jon M. Dickinson; Robert D. Varitz

(57) ABSTRACT

A method generally for output handling a new imaging job, and specifically for handling such a job by delivering it to one of several currently job-engaged imaging output devices (illustrated as printers) including the steps of (a) examining the current job-processing statuses of such devices, and (b) from the result of that examining, determining the respective remainders in the amounts of current-job work still to be performed by those devices. The method thus features the acquisition and use of output device busyness information as an important part of the approach toward promoting efficient output handling of new imaging jobs.

9 Claims, 2 Drawing Sheets

Total Bytes = 1.2 Mb of Spool Data + 21Mb RIP Data

VOLUME OF WORK ESTIMATING FOR COMBINED PROCESSING AND UNPROCESSED IMAGING JOBS

BACKGROUND AND SUMMARY OF THE INVENTION

This invention relates to the handling of imaging jobs in an imaging-job system, and in particular to the function of deciding issues relating to the handling of a new imaging job based upon acquired knowledge regarding the current statuses of busyness of plural, currently engaged imaging output devices of any category. A preferred and best-mode embodiment of, and manner of practicing, the invention are described and illustrated herein, for representational purposes, in the context of handling print (imaging) jobs, and more specifically to the maximizing of print-job handling through the delivery of new print jobs to different ones of plural, currently engaged printers based upon knowledge of those printers' respective current statuses of busyness.

Notwithstanding the specific use of a printing environment, and the distribution to printers of new print jobs, to illustrate the invention throughout this disclosure, it should be understood that other imaging environments and devices may utilize the invention. Included among, but not limiting, other such environments are those involving faxing, scanning, copying, document archiving and retrieving, document converting and manipulation, and document transferring.

As will be seen, the present invention, to accomplish the above-mentioned behavior, features the practice of determining the respective remainders in the amounts of current-job work still to be performed by the several imaging output devices before they will become available to take on a new job. This determination may be expressed, for example, as (a) assessing completion job sizes relating to the current jobs, and/or as (b) assessing the times-to-availability of the respective, associated output devices.

In a printing environment where one desires to complete the outputting of a print job as soon as possible, the user sends the print job to a compatible printer (or device) believed to be the one which will complete the job the soonest. Several methods exist to automate this process. One such method is pool printing. In a pool printing system, a system component analyzes the requirements of the imaging job and the status and performance capabilities of a pool of compatible imaging devices, and determines which device will complete the job the soonest.

Another method involves job splitting. In job splitting, a component in a system performs an analysis of the job and of a group of compatible imaging devices to determine a proportional distribution of subparts of the imaging job, such that each device completes at approximately the same time. Another objective in a job-splitting practice is that the selection of devices and distribution results in the soonest completion of any combination within the group.

When all of the devices in the pool or group are idle and in a warmed-up state, the selection and distribution of jobs tends to be very reliable, where generally only the performance capabilities of devices are required. However, when at least one of the candidate devices is busy, and the distribution is likely to include at least one of the busy devices, the determination of availability is much more complicated. In the case of pool printing, if all of the potential devices are busy, not only is it important to know how fast a device can print a print job (i.e., performance capabilities), but also to know when a device will be available in relation to the other devices. In the case of job splitting, if at least one of the devices is busy, again it is important, in order to calculate the appropriate distribution, to know when each of the busy devices will be available.

Thus, simply determining device status (i.e., idle vs. busy) is not sufficient. Several methods exist to quantify how busy a device is. One of these methods involves counting the number of jobs currently assigned (e.g., processing, pending and spooling) to a device. The device with the smallest number of assigned jobs (e.g., print queue) is assumed to be the first available. This approach, however, is only reliable if the jobs on the devices are approximately the same size. Otherwise, the method can be substantially inaccurate, especially where the device with the smaller/smallest number of jobs has jobs substantially greater in size than the other 'more busy' devices.

An improved prior art approach involves estimating the total workload of the assigned jobs. One practice involves counting the number of sheets that will be output by the assigned jobs. This method is only reliable if the jobs are in the same state of processing (e.g., pending), and the amount of rendering/RIP per sheet is approximately the same. Otherwise, the method can be significantly incorrect. For example, a sheet with only plain text will render in little to no time, while a sheet with complex graphics may take a substantial amount of time. The state of the job is also important. For example, if a job is pending, none of the sheets have been rendered/RIP or output. But if a job is processing, some subset of the job is rendered/RIP and/or output.

Still another prior art approach involves counting the number of bytes in the current jobs. A job with a smaller byte size is assumed to render/RIP faster than a job of greater size. For example, a one page job with only text will be substantially smaller than a one page job with complex graphics. This method is only reliable if the jobs are in the same state of processing (e.g., pending), and the number of sheets in each job is approximately the same. For example, a 1000-page job of only plain text may still produce a spool file smaller or equal to a one-page complex graphic job. While the latter job will take longer to render a single sheet, the outputting of a 1000-sheets will dominate the elapsed time to complete the jobs.

While these and other prior art efforts take aim at addressing the issue focused upon generally by the present invention, none offers the efficiency and accuracy attained by the method of the present invention. This invention, as was briefly mentioned earlier herein is based upon taking an actual look at the exact states of current busyness (i.e., how busy?) of prospectively available but currently engaged printers (imaging output devices), and upon offering quite precise information regarding answers to this question. Engaged printers' statuses are, with particularity, assessed with respect to their respective states of current job processing, and information for each printer is generated with accuracy regarding how much of a currently-being-handled job still needs to be done. Several implementations are described herein.

Thus, the invention proposes an effective method of determining when a busy printing device will be available by weighting each sheet in the job according to its byte size and state of processing.

An imaging job is decomposed into the number of sheets. The total outputting time for the job can then be calculated from the number of sheets and the performance capabilities of the marking engine (e.g., ppm). Each sheet is further decomposed into the number of bytes of data associated with the sheet (e.g., spool data size), such that each sheet can be weighted to calculate the amount of time to render/rasterize each sheet. Each sheet in the job is then classified as to where in the processing state it is (e.g., unprocessed, RIP'd, output).

The total elapse time to process a job can then be calculated as the total time for rendering/rasterizing the unprocessed sheets plus the total time to output the unprocessed and rendered/rasterized sheets.

Further, practice of the invention may include retaining spool data size and render/rasterize time of render/rasterized sheets to derive a weighting method to associate the spool data size with the time to render/rasterize.

The various features and advantages offered by the present invention will become more fully apparent as the description which now follows is read in accordance with the accompanying drawings.

DETAILED DESCRIPTION OF THE INVENTION

Figure 1:
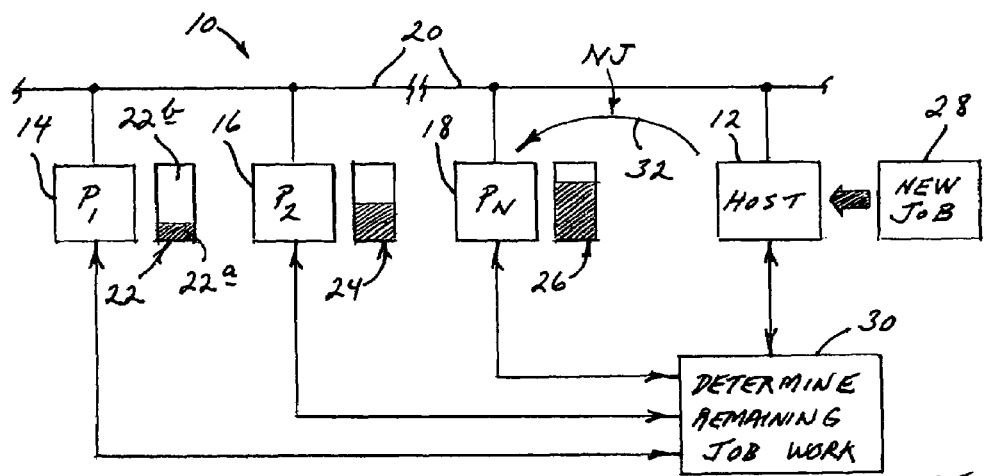
FIG. 1 is a simplified, high-level, block, schematic diagram which illustrates generally the preferred and best-mode implementation of the present invention in the environment of a network-connected printing system.

Turning now to the drawings, and referring first of all to FIG. 1, indicated generally and fragmentarily at 10 in this figure is a network-connected printing, or imaging, environment (or system). Environment 10 includes a host computer, or host 12, and three printers, or output imaging devices, 14, 16, 18. Host 12 and printers 14, 16, 18 are represented by blocks. Printers 14, 16, 18 are also labeled $P_1$, $P_2$, $P_n$, respectively. An appropriate network communication medium 20 interconnects host 12 and these three illustrated printers, and this medium, which is shown in FIG. 1 in the form of a wired medium, may be either wired or non-wired.

Printers 14, 16, 18, are currently busy and engaged in handling three current print jobs represented by rectangles 22, 24, 26, respectively, and each of these rectangles is divided into lower shaded, and upper unshaded, portions, such as portions 22a, 22b respectively, shown for job 22. Shaded portions of rectangles 22, 24, 26 represent, essentially, the percentages of these jobs which have been processed (and perhaps also output, or printed), and the unshaded portions represent remainder amounts or percentages of the jobs still waiting to be processed and output. Job 22 is the one which is the least completed. Job 24 is the one which is the next most completed. Job 26 is the one which is the most completed.

Two additional blocks 28, 30 are presented in FIG. 1. Block 28 represents a new print job which is awaiting delivery by host 12 to a selected one of printers 14, 16, 18. Block 30 represents appropriate practice of the present invention to determine which one of printers 14, 16, 18 should receive this new job—a practice which involves the making of such a determination based upon a status examination of each of currently engaged printers 14, 16, 18 to learn effectively the amount of associated current-job work which still needs to be performed by the printer to complete the job.

These determinations will be employed in the making of a choice regarding the delivery of new job 28 to one of printers 14, 16, 18, so as to attain the most efficient "system printing throughout" for that job. An arrow 32 in FIG. 1, also labeled NJ is provided to indicate the ultimate, and representative, choosing of printer 26 to receive job 28.

Figure 2:
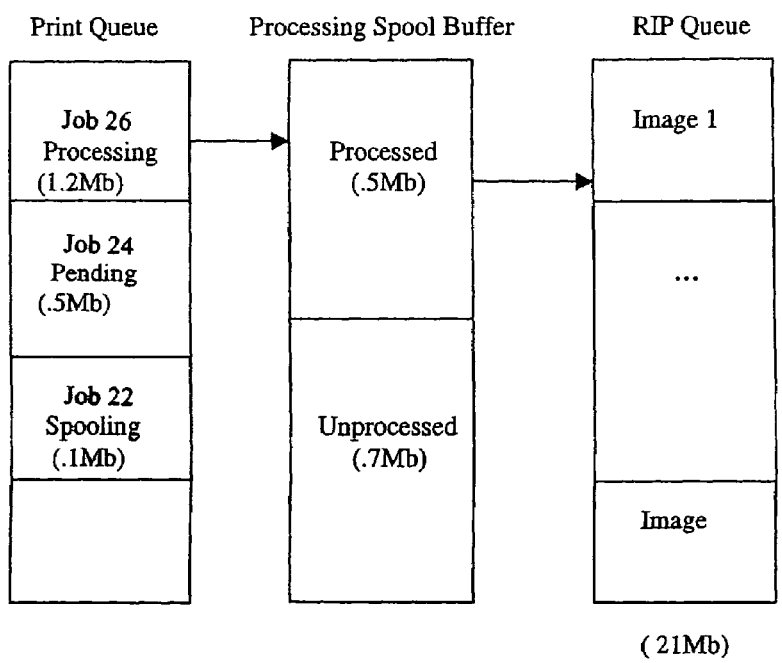
FIG. 2 is as a simplified diagram showing certain imaging (print) job decompositions which take place during an early stage in the practice of the invention.
Figure 3:
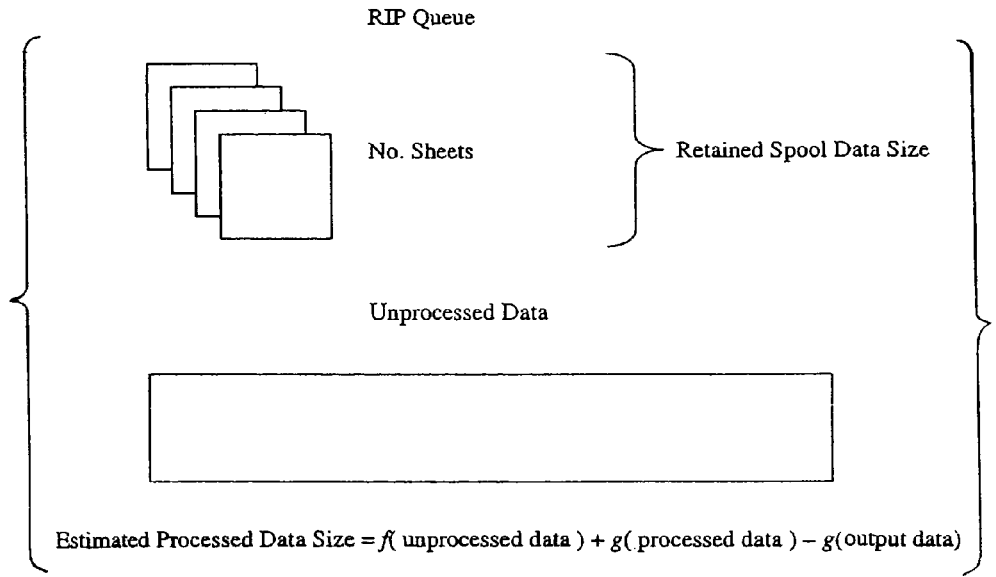
FIG. 3 is a simplified, schematic diagram of one preferred practice of the invention wherein unfinished current print job size is used to help determine the anticipated readiness of an associated printer to take on a new print job.
Figure 4:
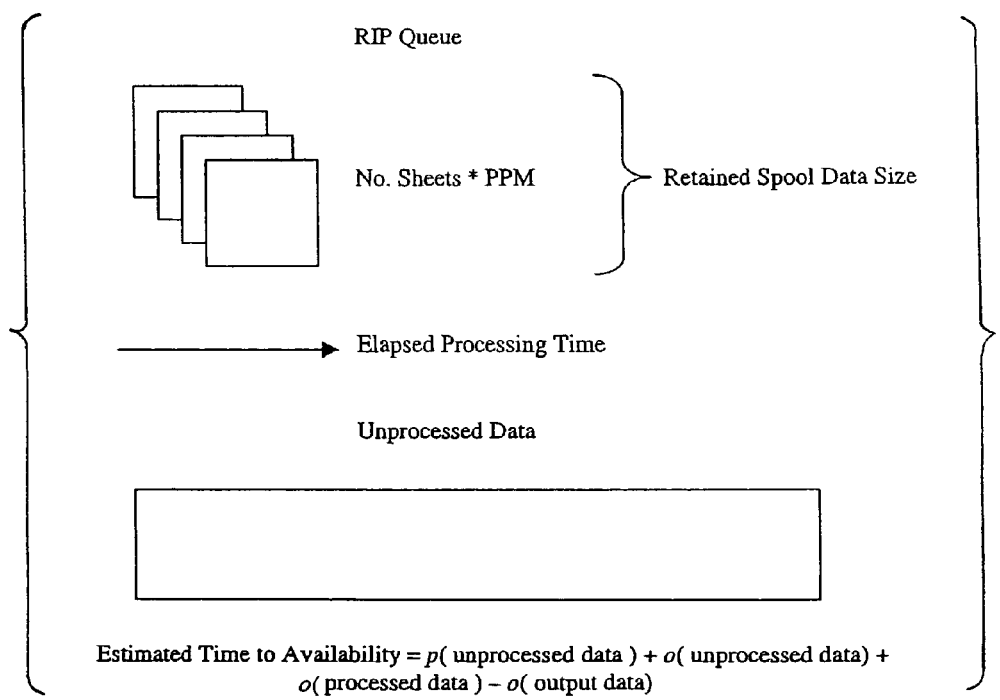
FIG. 4 is a simplified, schematic diagram of another preferred invention practice which involves assessment of the time-to-availability for a currently busy printer.

Turning attention now to FIGS. 2-4, inclusive, along with FIG. 1, and generally describing practice of the invention in the context of what is shown in FIG. 1, on the occasion of new print job, such as new print job 28, being readied by a host computer, such as by host computer 12, for delivery to a prospectively available one of currently busy printers, such as printers 14, 16, 18. Each active job which is currently assigned to a printer (device), typically via a print queue, is decomposed into its current processing status. Such a status may include the following processing states:

1. Processing~Some portion of the imaging job is in some stage of processing.
2. Pending~The imaging job is fully de-spooled to the device, but none of the job has started processing.
3. Spooling~The imaging job is not fully de-spooled to the device, and none of the imaging job has started processing.

Imaging jobs that are in a "processing state" in a printer are further decomposed into:

1. Output~Processing has completed and the image (e.g., sheet) has been fully output (e.g., sheet ejected).
2. Processed~The data has been fully processed for outputting, but the image has not been output (e.g., rendered/rasterized).
3. Unprocessed~No processing has occurred on the data, where the unprocessed data is the initial data sent to the printer.

FIG. 2 illustrates these decomposition practices with reference to jobs 22, 24, 26.

This decomposition practice is preferably performed whenever a new job is "readied" for handling. It constitutes an important and useful predecessor activity with respect to two different, subsequently implemented preferred manners of practicing the invention now to be described. Both of these "manners", following decomposition, leads to the end-result, desired "How busy?" determinations regarding the currently engaged printers. More specifically, each "manner" leads to a determination about how much current-job work still lies ahead for the respective associated printers.

Workload Estimate by Remaining Job Size—Illustrated in FIG. 3

The first practice "manner" now to be described presents two variations for assessing the size of remaining current-still-to-be-completed, job work. The second practice "manner" involves assessing the respective times-to-availability of the relevant, currently occupies printers.

After job decomposition, as just described above, has taken place for each of the current printer-occupying jobs, such as jobs 22, 24, 26, a remaining, probable workload size assessment for each job and associated printer may be calculated by determining, for each, an estimate of the probable processed size (e.g., after rendering and raster image processing (RIP)) of the remaining portion of a print job that has not yet been output. This estimate should take into account the combination of (a) the size of the current processed job data that has not yet been output, and (b) the likely processed size of the unprocessed data.

One way of accomplishing this estimate involves the step of decomposing all completely processed job data, including fully output data, into sheets that will be, or have been, output by the associated printer. As an illustration, this may be done by examining the RIP queue for the printer, which queue may retain information relating to (a) the size of the predecessor unprocessed data for each already processed sheets, and (b) the size of the processed data for the already output sheets.

$$P\% \text{ (Percent Processed)} = R_{size} \text{ (Retained Unprocessed Data Size for Processed Sheets)}/J_{size} \text{ (Total Unprocessed Job Size)}$$

$$U\% \text{ (Percent Unprocessed)} = 100 - P\%$$

Next, an estimate is made of the probable processed (i.e., RIP) size of the remaining unprocessed job as follows:

$$U_{est} \text{ (Processed Size Estimate for Remaining Unprocessed Data)} = (U\%/P\%) * P_{size} \text{ (Retained Processed Data Size for Processed Sheets)}$$

Finally, an estimate is made of the desired probable total processed size of the non-output portion of the job data as follows:

$$P_{est} = U_{est} + P_{size} - O_{size} \text{ (Retained Processed Data Size for Output Sheets)}$$

Thus, this estimate is calculated as the estimated processed data size of the unprocessed data, plus the actual size of the processed data, minus the actual size of the subset of processed data that has already been output. No consideration is made as to the time to render/rasterize the unprocessed data into processed data.

In a variation on the above methodology, a remaining workload estimate is based on an estimated number of remaining non-output sheets. Specifically, an estimate is made of the probable total number of sheets of the remaining portion of a print job that has not been output. This estimate includes a combination of the number of sheets of the current processed data that has not yet been output, plus an estimate of the likely number of sheets of the unprocessed data.

First the processed (including output) imaging data is decomposed into sheets. Next, an average unprocessed data size per processed sheet is calculated as follows:

$$U_{ave} \text{ (Average Unprocessed Data Size per Processed Sheet)} = R_{size} \text{ (Retained Unprocessed Data Size for Processed Sheets)}/P_{Sheets} \text{ (Number of Processed Sheets)}$$

Following this step, an estimate is made of the probable number of processed sheets that will be processed from the unprocessed data as follows:

$$U_{sheets} \text{ (Processed Sheet Estimate for Remaining Unprocessed Data)} = U_{size} \text{ (Remaining Unprocessed Data Size)}/U_{ave}$$

Finally, the desired workload estimate is made of the probable number of sheets in the non-output portion of the job as follows:

$$T_{est} \text{ (Estimated Number of Total Sheets)} = U_{sheets} + P_{sheets} - O_{sheets} \text{ (Number of Output Sheets)}$$

From a review of the two specific practices just set forth above, one will see that this "job-size" approach to implementing the present invention can be expressed as follows:

$$\text{Estimated, Still-to-be-Processed Data Size} = f(\text{unprocessed data}) + g(\text{processed data}) - g(\text{output data}).$$

Thus, any approach which implements this formula is useable in accordance with the present invention.

Workload Estimate by Time to Availability—Illustrated in FIG. 4

In this other preferred manner of practicing the invention, the uncompleted workload is estimated by deriving an estimated time to printer availability as a combination of (a) the time to output the unprocessed, and (b) yet not output processed data. Plural jobs are compared according to these estimated times to availability.

In this approach, in addition to determining appropriately the previously unprocessed data size of the processed data, so also determined are the estimated, elapsed times for processing the unprocessed data into processed data, and for outputting processed data.

To do this, and as is illustrated mathematically below, an estimate is made of the probable time to output the remaining portion of a print job that has not been output. This estimate includes (a) a combination of the estimated time to process the unprocessed data into processed data, and (b) the estimated time to output both the unprocessed data and the data that is already processed but not yet output.

The quantities calculated in this manner of practicing the invention, and the specific related calculations performed, are as follows:

The percentage of the total unprocessed job data that has been processed:

$$P\% \text{ (Percentage Processed)} = R_{size}(\text{Retained Unprocessed Data Size for Processed Sheets})/J_{size}(\text{Total Unprocessed Job Size})$$

$$U\% \text{ (Percentage Unprocessed)} = 100 - P\%$$

An estimate of the probable processing time (e.g., RIP) of the remaining unprocessed job data:

$$U_{time} \text{ (Processed Time Estimate for Remaining Unprocessed Data)} = (U\%/P\%) * P_{time} \text{ (Retained Processed Time for Processed Data)}$$

The percentage of the processed data that has been output:

$$O\% \text{ (Percentage Output)} = O_{size}(\text{Retained Processed Data Size for Output Data})/P_{size} \text{ (Processed Data Size)}$$

$$N\% \text{ (Percentage Non-Output)} = 100 - O\%$$

An estimate of the probable time to output the non-output processed data:

$$P_{out} \text{ (Estimated Time to Output Non-Output Processed Data)} = (N\%/O\%) * O_{out} \text{ (Retained Time to Output Processed Data)}$$

An estimate of the probable time to output the unprocessed data:

$$U_{out} \text{ (Estimated Time to Output the Unprocessed Data)} = (U\%/P\%) * (P_{out} + O_{out})$$

And finally, an estimate of the total time to output the remaining non-output unprocessed and processed data:

$$T_{out} = (\text{Estimated Time to Output Remaining Non-Output Data}) = U_{time} + U_{out} + P_{out}$$

In a modification of this approach, an estimate is made of the time to availability that includes an estimate for the number of output sheets.

In another modification, an estimate is made of the probable time to output the remaining portion of a print job that has not been output. This estimate is a combination of the estimated time to process the unprocessed data into processed data, plus an estimate of the time to output the unprocessed data and already processed data, based on deriving an estimate of the probable number of remaining sheets and the performance capabilities of the device (e.g., pages output per minute).

First, the non-output processed data is decomposed into sheets ($N_{sheets}$).

Next, an estimate is made of the probable number of processed sheets that will be processed from the unprocessed data, as described earlier:

$U_{sheets}$ (Processed Sheet Estimate for Remaining Unprocessed Data)=$U_{size}$ (Remaining Unprocessed Data Size)/$U_{ave}$ Finally, an estimate is made of the total time to output the remaining non-output unprocessed and processed data, as:

$T_{out}=U_{time}+((U_{sheets}+N_{sheets})*PPM)$

In the above, the estimate is calculated as the estimated time to process the unprocessed data into processed data, plus the combined number of estimated unprocessed and processed non-output sheets times the performance capabilities, per unit of time, for outputting the sheets.

In another variation of the above, the unprocessed data is analyzed according to the imaging data format (e.g., PDL) and job assembly instructions (e.g., PJL) to determine the exact number of sheets for the unprocessed data ($U_{sheets}$).

The above methods are just a few examples of combining the unprocessed data and processed data into an estimated amount of total time to process and output the remaining non-output data. Any method could be used, which can be represented by the general formula, where p() and o() are functions representing the time to process and output respectively:

Estimated Time to Availability=$p$(unprocessed data)+$o$(unprocessed data)+$o$(processed data)−$o$(outputted data).

Thus, implementation of the present invention, in any one of the several specific practice variations associated with the two different preferred and described approaches (i.e., determining incomplete job size currently being handled by busy printers; and determining busy-printers' respective times-to-availability), very accurately addresses and describes a basis for efficient-throughput allocation of a new job to a printer in a situation wherein all prospectively available printers are currently working on previously allocated "current" jobs. This "How busy?" determination methodology offers a significantly improved way of distributing new imaging jobs (illustrated herein by print jobs) to prospectively available, but currently busy, imaging output devices.

Practice of the present invention, as can be seen by those skilled in the art from the descriptions and illustrations presented herein, is easily enableable both in new and in existing imaging systems, and, as stated clearly earlier, is invokeable in basically all imaging processing-and-outputting environments. Accordingly, while preferred and best-mode manners of practicing the invention have been discussed and shown herein, it is understood that yet other variations and modifications which come within the scope of the invention, and which will come to the minds of those skilled in the art, are possible.

I claim:

1. A method for controlling the output handling of imaging jobs so as to improve imaging output handling in a system having plural, available imaging output devices which may have different operational capabilities, and any one or more of which may, at a given moment in time, be busy with an associated, but yet unfinished, active current job, said method comprising, for each such output device being considered for selection to handle a selected, but not yet distributed, new imaging job, examining the respective processing statuses of any currently active job by performing a first job-decomposition of the job into states including (a) processing, (b) pending, and (c) spooling, and, with respect to any such current job which is in a processing state, performing a second, processing-state-decomposition into conditions including (a) already output, (b) processed, and (c) unprocessed, by said examining, determining the remainder amount of current job work still to be performed by a device handling that job, and thereby establishing the busyness status of that device, comparing the established busyness statuses of the considered output devices, and utilizing results from said comparing, choosing the most appropriate output handling for a selected new job.

2. The method of claim 1, wherein output handling takes the form of efficiently distributing new imaging jobs to selected, currently busy imaging output devices, and said choosing involves selecting the most appropriate one of the considered output devices for the reception of such a selected new job.

3. For use in a network environment which includes plural, prospectively available, imaging output devices, each of which is presently engaged in handling an associated, current imaging job, a method for most effectively guiding the handling of a new imaging job based upon knowledge relating to the respective capabilities and current statuses of busyness of such devices, said method comprising examining the respective processing statuses of such currently-being handled jobs, wherein said examining, for each current job, includes performing a first job-decomposition of the job into states including (a) processing, (b) pending, and (c) spooling, and, with respect to a current job which is in a processing state, performing a second, processing-state-decomposition into conditions including (a) already output, (b) processed, and (c) unprocessed from said examining, determining the remainder amounts of current-job work still to be performed by the respective, associated output devices, and based upon said determining, establishing the statuses-of-busyness information currently related to such output devices.

4. The method of claim 3, wherein the desired status-of-busyness information is acquired for the purpose of guiding such a new imaging job to one of such output devices, and the subsequent use to which the busyness status information is put involves the appropriate choosing of a specific one of the output devices for the reception of the new imaging job.

5. The method of claim 4, wherein said determining involves the practice of assessing the respective times-to-availability of the different currently engaged output devices.

6. The method of claim 4, wherein the output devices are printers, and the current and new imaging jobs are at least one of (a) print jobs, (b) fax jobs, and (c) copy jobs.

7. The method of claim 3, wherein, for each current job, said first and second decompositions are followed by an activity characterized as a workload-estimate-by-job-size practice.

8. A method for delivering a new imaging job to one of several currently job-engaged imaging output devices comprising examining the current job processing statuses of such devices, wherein said examining, for each current job, includes performing a first job-decomposition of the job into states including (a) processing, (b) pending, and (c) spooling, and, with respect to a current job which is in a processing state, performing a second, processing-state-decomposition into conditions including (a) already output, (b) processed, and (c) unprocessed, and from said examining, determining the respective remainders in the amounts of current-job work still to be performed by those devices.

9. The method of claim 8, wherein the new and current imaging jobs are at least one of (a) print jobs, (b) fax jobs, and (c) copy jobs.

* * * * *